US012276156B2

(12) United States Patent
Greene

(10) Patent No.: US 12,276,156 B2
(45) Date of Patent: Apr. 15, 2025

(54) WEATHER STRIPPING ASSEMBLY FOR DOORS

(71) Applicant: Jacobs & Thompson Inc., Toronto (CA)

(72) Inventor: Robert Greene, Barrie (CA)

(73) Assignee: JACOBS & THOMPSON INC., Toronto (CA)

( * ) Notice: Subject to any disclaimer, the term of this patent is extended or adjusted under 35 U.S.C. 154(b) by 0 days.

(21) Appl. No.: 17/444,130

(22) Filed: Jul. 30, 2021

(65) Prior Publication Data

US 2023/0029792 A1 Feb. 2, 2023

(51) Int. Cl.
*E06B 7/23* (2006.01)

(52) U.S. Cl.
CPC .................................. *E06B 7/2316* (2013.01)

(58) Field of Classification Search
CPC ............................. E06B 7/2316; E06B 7/2312
USPC ............................................................ 49/310
See application file for complete search history.

(56) References Cited

U.S. PATENT DOCUMENTS 387,421 A * 8/1888 Keil ...................... E05F 1/1215 16/386
2,922,202 A * 1/1960 Kodaras .................... E06B 7/20 49/306
3,987,587 A * 10/1976 Miller ................... E06B 7/2316 49/495.1
4,380,260 A * 4/1983 Labelle ................. E06B 7/2316 160/183
4,406,088 A * 9/1983 Berndt, Jr. .............. E06B 7/215 49/309
4,603,452 A * 8/1986 Paciorek ................... E05D 7/10 16/386
4,691,478 A * 9/1987 Lorg ..................... E06B 7/2316 49/499.1
4,850,143 A * 7/1989 Crooimans ............. E06B 7/367 49/383
5,465,532 A * 11/1995 Varin .................... E06B 7/2316 49/470

(Continued)

FOREIGN PATENT DOCUMENTS

DE 202013002159 U1 * 5/2013 ............... E06B 7/18

OTHER PUBLICATIONS

Machine translation of DE202013002159U1.*

*Primary Examiner* — Marcus Menezes
(74) *Attorney, Agent, or Firm* — Aird & McBurney LP

(57) ABSTRACT

A weather stripping assembly is provided and includes a first backing member and a second backing member together defining a longitudinal axis, and first and second transverse directions. Each of the backing members includes a channel. The first backing member has a first alignment structure, and the second backing member has a second alignment structure. The first and second alignment structures are engageable with one another to align their channels with one another in the first and second transverse directions. A flexible seal is shaped to be held in and extend along the channels of both the first and second backing members when the at least two of the plurality of backing members are positioned with the first and second alignment structures in engagement with one another such that the channels of the first and second backing members are aligned with one another.

6 Claims, 8 Drawing Sheets

(56) References Cited

U.S. PATENT DOCUMENTS

| | | | | |
|---|---|---|---|---|
| 2006/0032144 | A1* | 2/2006 | Heroux | E06B 7/2316 49/469 |
| 2011/0030281 | A1* | 2/2011 | Vulpitta | E06B 7/2316 49/490.1 |
| 2021/0040790 | A1* | 2/2021 | Von Ryberg | E06B 7/2316 |
| 2022/0042371 | A1* | 2/2022 | Borovitz-Linda | E06B 7/18 |
| 2022/0282563 | A1* | 9/2022 | Koennecke | E06B 7/2312 |

* cited by examiner

WEATHER STRIPPING ASSEMBLY FOR DOORS

FIELD OF THE INVENTION

The present invention relates generally to a weather stripping assembly for a movable door. In particular, the invention relates to a weather stripping assembly for application to a door in a doorway.

BACKGROUND OF THE INVENTION

For external-facing doors in houses and buildings, gaps often exist between the various types of doors and the doorway or doorframe that surrounds the door. In particular, at the bottom and top of overhead garage doors, there is a need for an effective weather seal suitable for preventing cold air, snow, water and the like from entering the garage along the gaps that exist around the top and bottom of garage doors.

Existing weather stripping assemblies for garage doors typically include a weather stripping backer that is mounted to the outer edges of the door to provide a mount for a seal. The backers in existing weather stripping assemblies typically come in standard sizes and extend as one continuous piece across a full side of the door. These long backers pose a particular challenge for retailers and distributors, as their length makes it challenging to fit the backer products on standard shelves of hardware stores and also makes the backers particularly cumbersome for shipping and handling.

It is therefore an object of the invention to provide a novel weather stripping apparatus with a plurality of smaller, connectable backing members for mounting along a perimeter region of a first face of a door to provide a seal for the gaps around the external edges of the door. The various embodiments of the weather stripping assembly as described herein provide a more easily transportable system for use on various types of doors.

SUMMARY OF THE DISCLOSURE

In an aspect, a weather stripping assembly is provided for application to a door. The weather stripping assembly includes a first backing member and a second backing member together defining a longitudinal axis, and first and second transverse directions. Each of the first and second backing members includes a channel. The first and second backing members each have a mounting region that is positioned for mounting to a perimeter region of a door. The first backing member has a first alignment structure on a first end thereof, and the second backing member has a second alignment structure on a first end thereof. The first and second alignment structures are engageable with one another to align the channel of the first backing member with the channel of the second backing member in the first transverse direction and the second transverse direction. The weather stripping assembly further includes a flexible seal that is shaped to be held in and extend along the channels of both the first and second backing members when the at least two of the plurality of backing members are positioned with the first and second alignment structures in engagement with one another such that the channels of the first and second backing members are aligned with one another.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
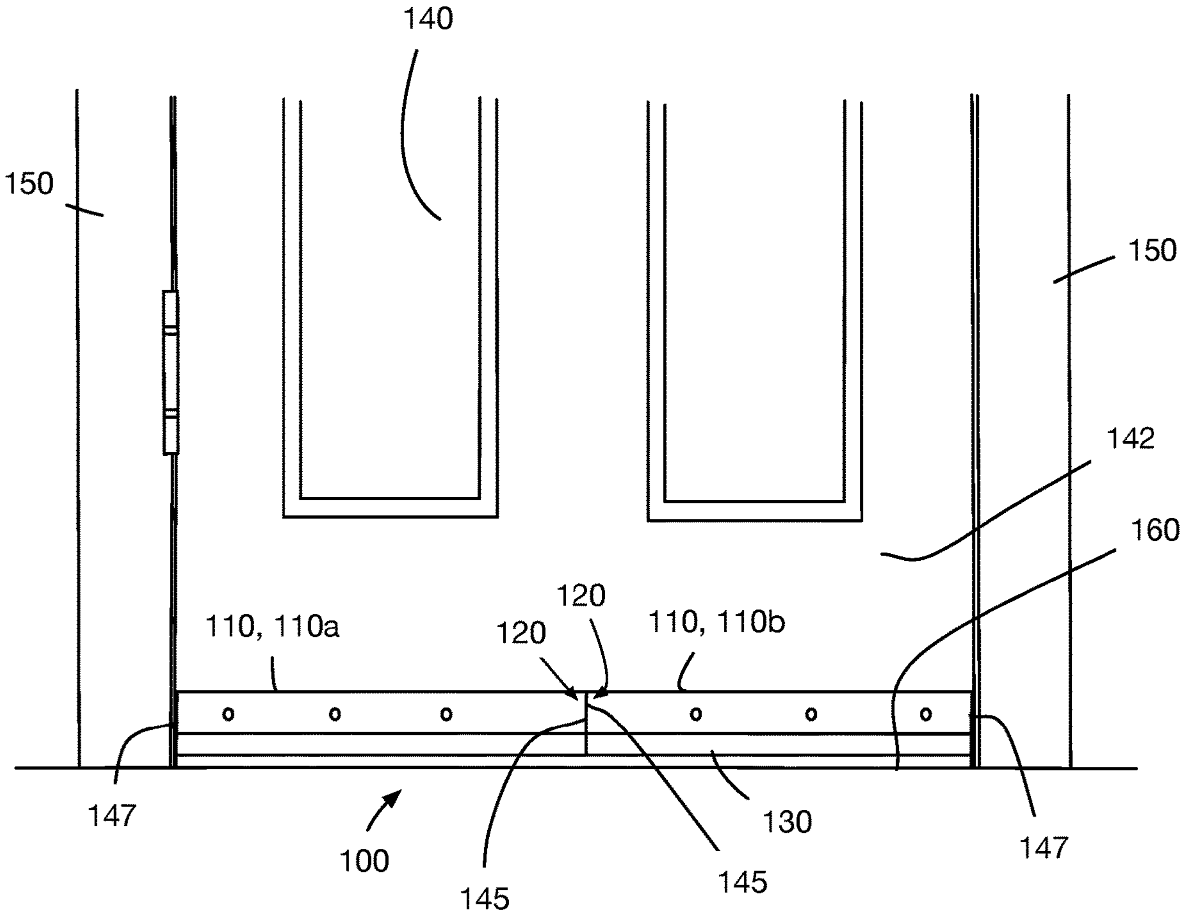
FIG. 1 shows a front-facing perspective view of a weather stripping assembly mounted to a bottom perimeter region of a first face of a door.

Referring to FIG. 1 of the drawings, there is shown a door 140 in a closed position in a doorway 150, with the door 140 having an embodiment of the weather stripping assembly 100 mounted thereon. The weather stripping assembly is mounted along a bottom, perimeter edge and is in sealing engagement with the floor surface shown at 160.

Figure 2:
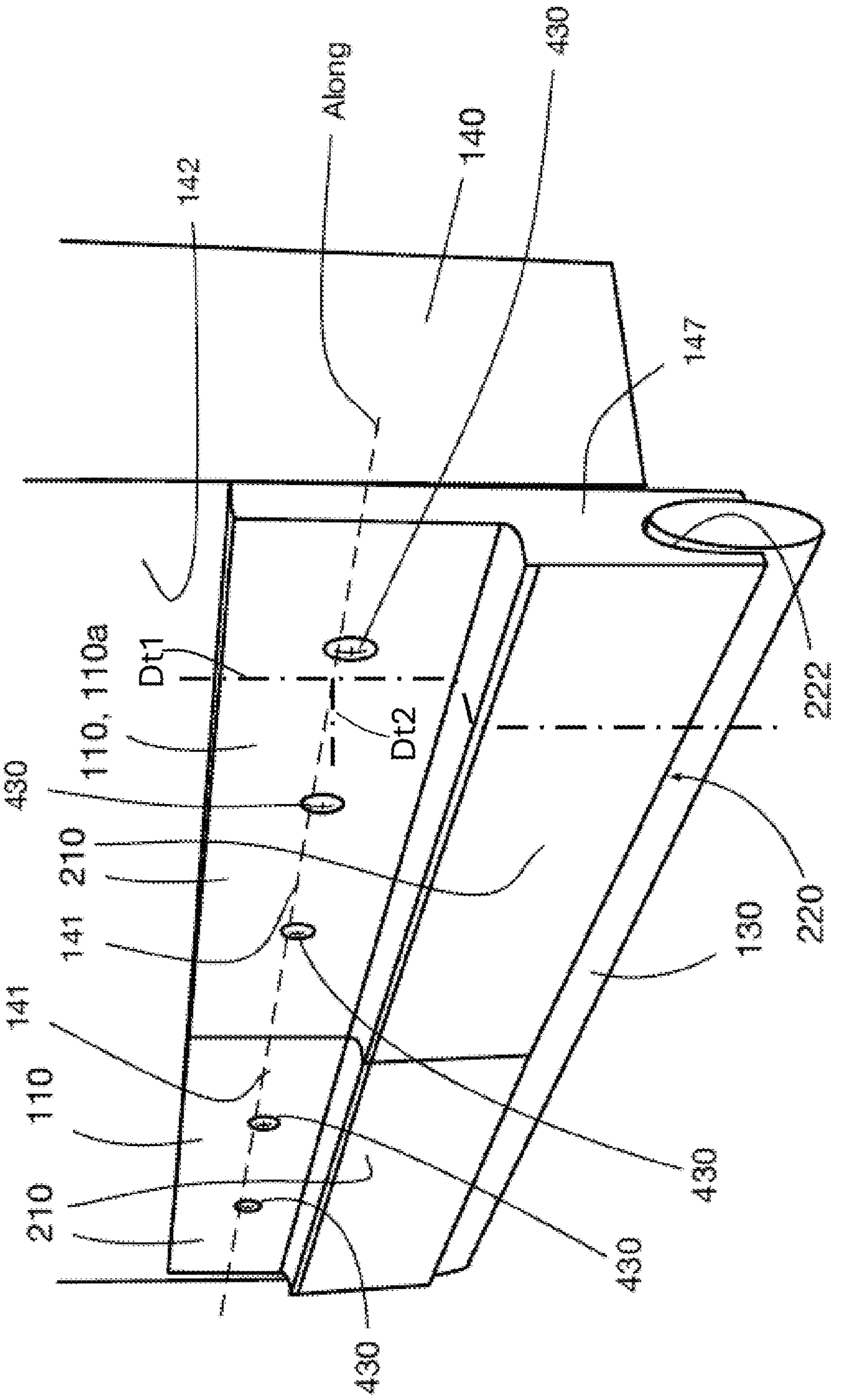
FIG. 2 shows a perspective view of the weather stripping assembly shown in FIG. 1.

Referring to FIG. 1, the weather stripping assembly 100 as shown comprises a plurality of backing members 110, each being elongate, and therefore has a longitudinal axis along, that is parallel to the length of the backing members. Each of the plurality of backing members 110 is sized to be mounted around at least a portion of a perimeter region of a first face 142 of the door 140 in the doorway. Each of the plurality of backing members 110 include at least first and second longitudinal faces 210, 220. Referring to FIG. 2, each of the plurality of backing members 110 defines a first transverse direction Dt1 and a second transverse direction Dt2, which are transverse to the longitudinal axis of the backing member 110, and are transverse to one another. In the present example, the first longitudinal face 210 is generally in a vertical plane, when the weather stripping assembly 100 is mounted and in use on a door 140 for a typical household, and the second longitudinal face 220 is on an underside of the weather stripping assembly 100, and extends generally in a horizontal plane, when the weather stripping assembly 100 is mounted and in use on a door 140 for a typical household. A mounting region 141 of the backing members 110 is formed to be mountable along at least a portion of the perimeter region of a first face 142 of the door 140, such that the first longitudinal face 210 faces away from the first face 142 of the door 140 in the second transverse direction Dt2. The second longitudinal face 220 includes a channel 222 spanning a full length thereof, terminating at first and second ends 145 and 147 of the backing member 110.

Each of the plurality of backing members 110 includes an alignment structure 120 positioned on at least one of the first and second ends 145 and 147. Each alignment structure 120 is formed to engage with an alignment structure 120 of another of the plurality of backing members 110. The alignment structures 120 are positioned to align at least two backing members 110 when the backing members 110 are positioned adjacent to one another along the perimeter region of a first face 142 of the door 140.

When mounting the backing members 110 along the perimeter region of the first face 142 of the door 140, multiple backing members 110 may be positioned adjacent to one another to form a series of backing members 110 spanning at least part of at least one edge of the door. The alignment structures 120 on the mutually facing first ends 145 of the adjacent backing members 110 are engageable with one another to facilitate the alignment of the adjacent backing members 110. For example, a first backing member 110*a* and a second backing member 110*b* are positionable adjacent one another, such that a first alignment structure 120*a* on a first end 145 on the first backing member 110*a*, is adjacent a second alignment structure 120*b* on a first end 145 of the second backing member 110*b*, such that the first and second alignment structures 120*a* and 120*b* engage one another so as to align the channels 222 of the first and second backing members 110*a* and 110*b* with one another.

The weather stripping assembly 100 further includes a flexible seal 130. The flexible seal 130 is shaped to be received by and extend along the coaxially aligned channels 222 of the first and second backing members 110. The flexible seal 130 can be mounted in the coaxially aligned channels 222 when the at least two of the plurality of backing members 110 are adjacently mounted and aligned along a perimeter region of the first face 142 of the door 140. As is shown in FIG. 1, the flexible seal 130 is received within the coaxially aligned channels 222 such that a portion of flexible seal 130 extends from the channel 222, beyond the perimeter region of the first face 142 of the door 140 into a gap or crack located between the door 140 and a frame of the doorway 150 or the floor surface 160. In this way, the flexible seal 130 when mounted to the plurality of backing members 110 is positioned for inhibiting drafts of air from passing between the door 140 and the doorway 150.

In an embodiment, the dimensions of each of the backing members 110 can be customized on a case-by-case basis. In each case, the length and width of each of the plurality of the backing members 110 are determined by the length and width of the door 140 to which the backing members 110 are to be attached.

In an alternative embodiment, the weather stripping assembly 100 is sized for application to a door 149 that is a standard residential door. Residential doors typically have standard dimensions including a length of at least 36 inches, and a height of at least 82 inches.

In an embodiment, the plurality of backing members 110 are each sized such that a length of the backing member 110 is at most, about the length of the shortest edge of the first face 142 of the door 140 on which the plurality of backing members 110 are applied. For the door 140 described above, this means that the backing members 110 have a length that is at most about 36 inches. The term 'about' is intended to include lengths that are slightly longer than the length of the shortest edge, optionally by 2, 3, or 4 inches in order to ensure that the weather stripping assembly 100 is slightly oversized and can be cut to precisely the length of the bottom edge of the door 140, even if the door 140 itself is slightly larger than typical. In another embodiment, the plurality of backing members 110 are each sized such that a length of each backing member 110 is no greater than half the length of the shortest edge of the first face 142 of the door.

In yet another embodiment, the plurality of backing members 110 are each sized such that a length of each backing member 110 is no greater than a selected length, such as about four feet (or some other suitable length), to ensure that the package that contains one or more of the backing members 110 can fit on a standard shelf and does not require a special place for being stored in a vertical orientation, when displayed for purchase in a retail store. By contrast, a typical door seal of the prior art may be too tall to fit on a shelf, and is therefore stored in a vertical orientation in a special receptacle in a toy store.

In another embodiment, the weather stripping assembly may be sized for application to a garage door. Garage doors typically have standard sizes of either eight feet or sixteen feet in length and eight feet in height.

In this embodiment, the plurality of backing members 110 may each be sized such that a length of each backing member 110 is no greater than about half the length of the longest edge of the first face 142 of the door 140.

The plurality of backing members 110 may be composed of a metal including but not limited to aluminum, stainless steel, or any other suitable metal. Alternatively, backing members 110 may be formed of a rigid or semi-rigid material, such as plastic (e.g., nylon).

Many arrangements of the first longitudinal face 210 of the backing members 110 may be utilized for making the face mountable to the door 140.

The backing members 110 each have a mounting region 141 that is positioned for mounting to the perimeter region of the first face of the door 140. In the embodiments shown in FIGS. 2-8C, the mounting region 141 includes a plurality of mounting apertures 212 spaced longitudinally along the first longitudinal face 210. As is shown in FIG. 4, each of the mounting apertures 212 extends from the first longitudinal face 210 to an opposite longitudinal face on the other side of the backing members 110 to allow the pass-through of mechanical fasteners 430 to pass through the backing member 110 and into the door 140. The securing elements 430 may be screws (e.g., wood screws), nails, or any other suitable mechanical fasteners for holding the backing members 110 to the door 140. Each of the plurality of mounting apertures 212 of the first longitudinal face 210 is sized to receive therethrough one of the securing elements 430.

In an alternative embodiment, the face of the backing member 110 that is in contact with the door 140 is mounted to the door 140 by way of an adhesive.

Figure 3:
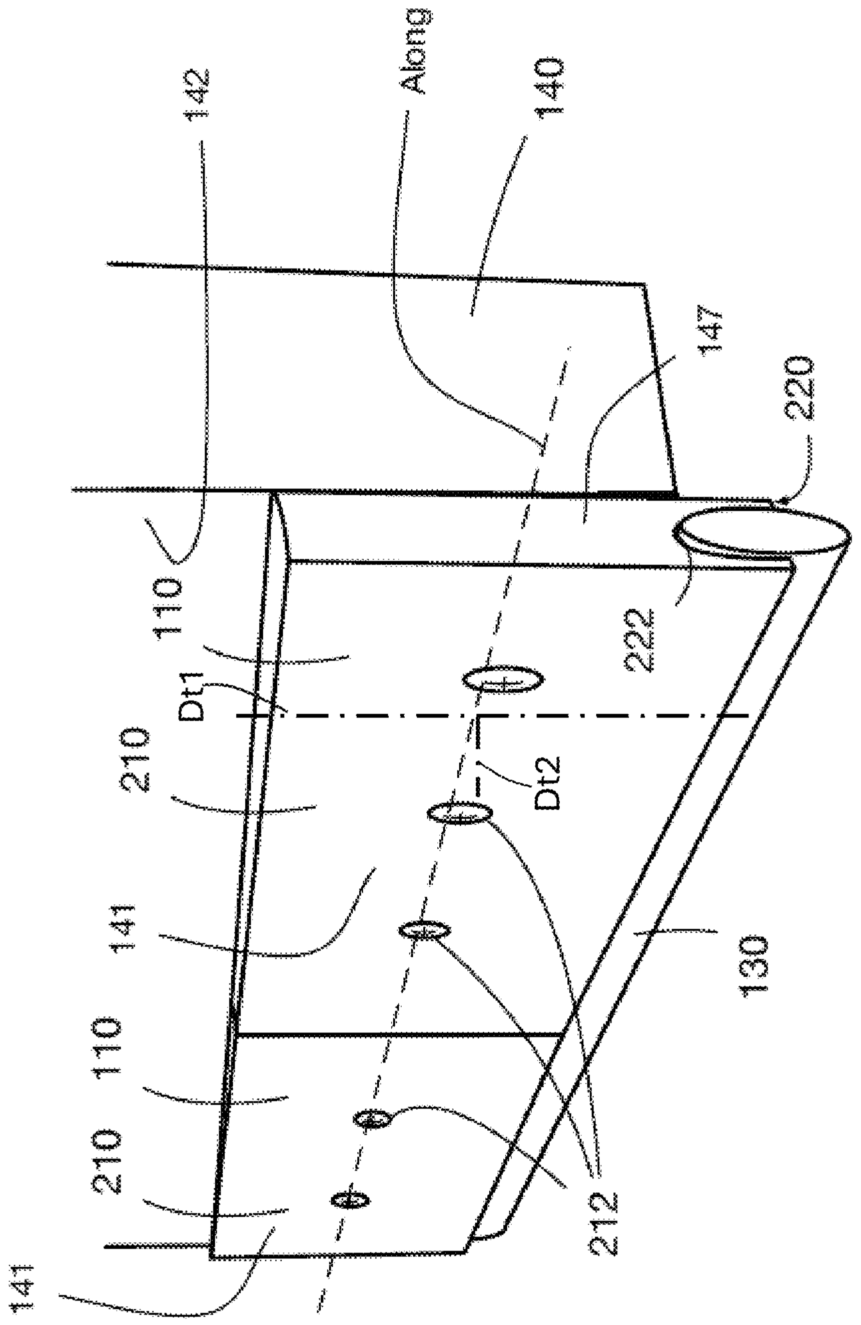
FIG. 3 shows a perspective view of an alternative embodiment of the weather stripping assembly having a backing member of a different shape than that shown in FIGS. 1 and 2.
Figure 5:
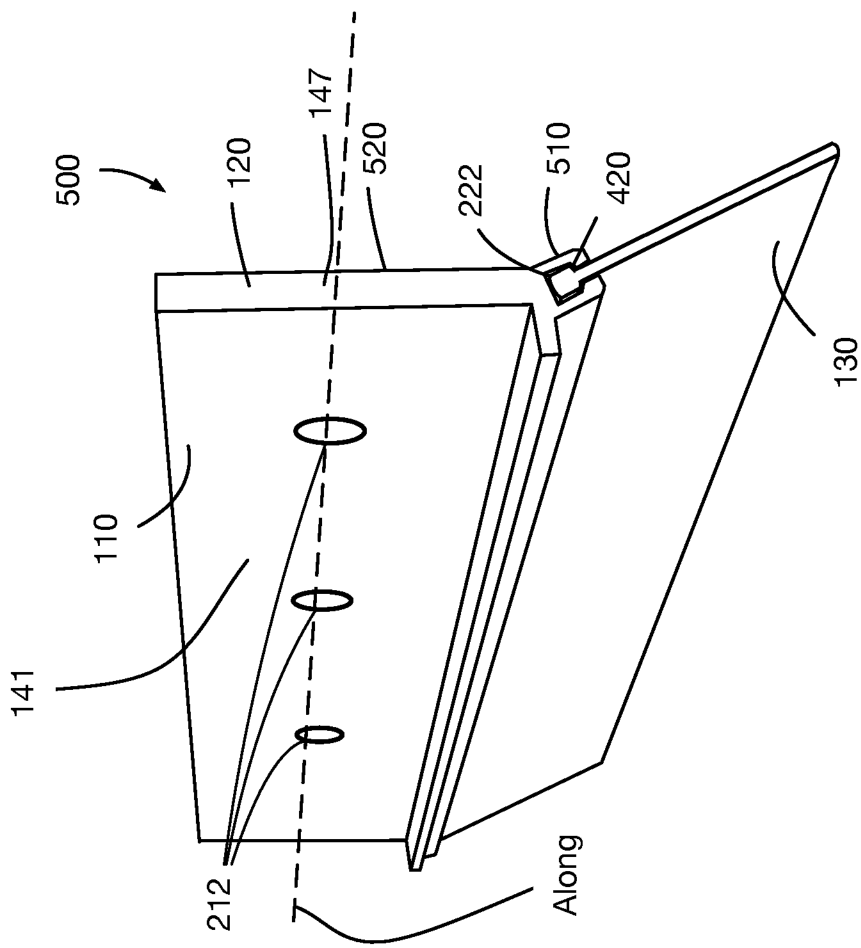
FIG. 5 shows a perspective view of yet another alternative embodiment of the weather stripping assembly having a backing member that is shaped to hold a flexible seal at a different angle than that which is shown in FIGS. 1-4.
Figure 4:
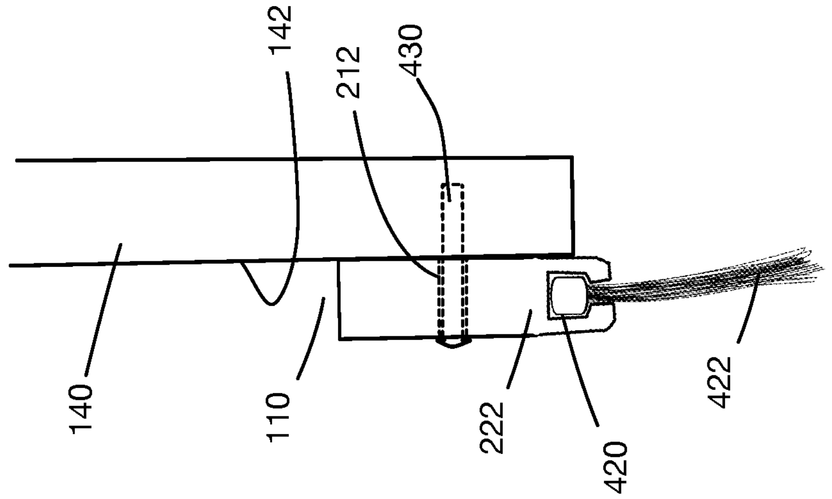
FIG. 4 shows an end view of another alternative embodiment of the weather stripping assembly having a flexible seal that is differently configured than those shown in FIGS. 1-3.

Some minor differences between the embodiment shown in FIGS. 1 and 2, and the embodiments shown in FIGS. 3 and 4 include: For example, in the embodiment in FIGS. 1 and 2, the backing member 110 has a first region with a first thickness (the region through with the mechanical fasteners 430 pass through into the door 140), and a second region that has a second, greater thickness, in which the channel 222 is located. By contrast, the embodiment shown in FIG. 3 has a backing member 110 that has a uniform thickness along its height. In FIG. 4, the backing member has a constant thickness along an upper portion but further includes a lip at the bottom of this upper portion, and then includes a lower portion which has the channel 222 for holding flexible seal 130. Another difference between the embodiments shown in FIGS. 1-5 is that the lower portion of the embodiment in FIG. 5 is oriented such that (more precisely, the channel 222 is oriented such that) the flexible seal 130 is held at a non-zero angle relative to the plane of the door 140, whereas the backing members 110 in the embodiments shown in FIGS. 1-4 hold the flexible seal 130 at a zero angle relative to the plane of the door. Yet another difference between the embodiments shown in FIGS. 1-5 is that, in the embodiment shown in FIG. 4, the flexible seal 130 is formed from bristles, whereas the flexible seal 130 is formed from a unitary member in the embodiments shown in FIGS. 1-3 and 5.

As noted above, each of the second longitudinal faces 220 of each of the plurality of backing members 110 includes an integrally formed channel 222 spanning at least part of the length thereof. Each of the channels 222 formed along the second face of each backing member 110 has a cross-sectional form such that it can securely receive and hold at least a portion of the flexible seal. The channels 222 of the backing members 110 may be shaped in various ways depending on the shape of the flexible seal 130. As shown in FIGS. 4 and 5, the channel 222 may be shaped to have a rectangular cross-sectional shape. As shown in FIGS. 2 and 3, the channel 222 may have a generally partial-elliptical cross-sectional shape. Other cross-sectional shapes are also permitted for the channel 222, such as a trapezoidal cross-sectional shape, a T-shaped cross-sectional shape, or a partial circular cross-sectional shape.

In embodiments in which the flexible seal 130 is a unitary member, the flexible seal 130 may be composed of a resilient, compressible material, such as, for example, an elastomeric material.

Examples of suitable materials for the flexible seals 130 shown in FIGS. 1-3 and 5 include, but are not limited to, rubber, vinyl, polyolefin foam, synthetic polyisoprenes, polybutadienes, polychloroprenes, chlorosulfonated polyethylenes, elastomeric polyurethanes, fluorinated elastomers, isoprene-isobutylene copolymers, ethylene-propylene-diene copolymers, styrene-isoprene-styrene block copolymers. The flexible seal 130 may be made either from a solid (i.e., a non-cellular) material, or from a suitable closed-cell foam material.

Examples of suitable materials for the bristles that make up the flexible seal 130 shown in FIG. 4 include, but are not limited to, polypropylene, polyester, or nylon.

The flexible seal 130 may include an attachment portion 420 that is sized to be retained in the channels 222 of the backing members 110. The attachment portion 420 may be made from any suitable material such as a silicone-based material, or from a flexible or semi-flexible material, such as foam, felt or woven textile fabric of any suitable kind. The attachment portion may have a longitudinal cross section that is the same shape as that of the channel 222 but may be sized to be slightly larger cross-sectionally than the channel 222 itself. When the attachment portion 420 of the flexible seal 130 is inserted into the channel 222, the flexible or semi-flexible material of the attachment portion 420 will be partially compressed by the walls of the channel 222, so as to retain the attachment portion 420 snugly within the channel 222.

The alignment structures 120 of the embodiments shown herein are described further below. Various embodiments of the alignment structures 120 positioned on the first and second ends of each backing members 110 may be used. In the embodiments shown in FIGS. 1 to 9, when the mounting region 141 of the backing members 110 is mounted to the perimeter region of the door 140 (as shown in FIGS. 1 to 3), the first and second alignment structures 120*a*, 120*b* are positioned between the door 140 and at least one of the longitudinal faces 210 in the second transverse direction Dt2, and covered by at least one of the longitudinal faces 210 in the second transverse direction Dt2. Thus, the first and second alignment structures 120*a*, 120*b* are concealed from view when viewing the door 140 in the second transverse direction Dt2. Further, in the embodiments shown in FIGS. 6A to 8C, at least part of each of the first and second alignment structures 120*a*, 120*b* is defined by or extends from an end surface (e.g. end surfaces 172*a* and 172*b* in FIG. 6A) of the first end 145 of the first and second backing members 110*a* and 110*b*, respectively. When the mounting region 141 of the backing member 110 is mounted to the perimeter region of the door 140, each end surface (e.g., end surfaces 172*a* and 172*b* in FIG. 6A) extends from the longitudinal face 210 of the backing member 110 toward the door 140.

Figure 6A:
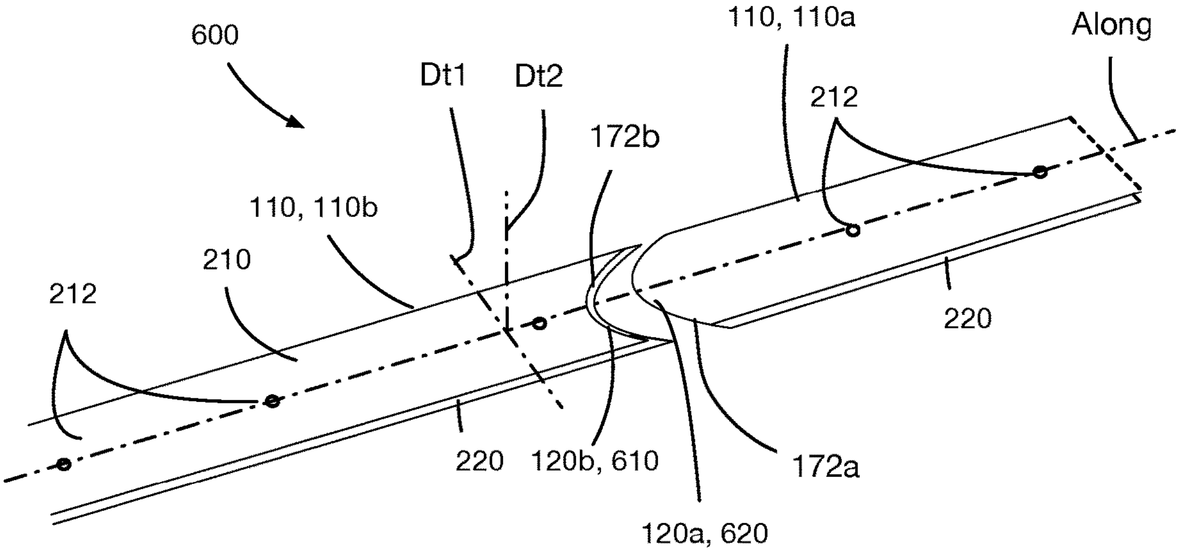
FIG. 6A shows an isometric view of an embodiment of the weather stripping assembly with first and second backing members, and an alignment structure formed by an arcuate projection and an arcuate recess.
Figure 6B:
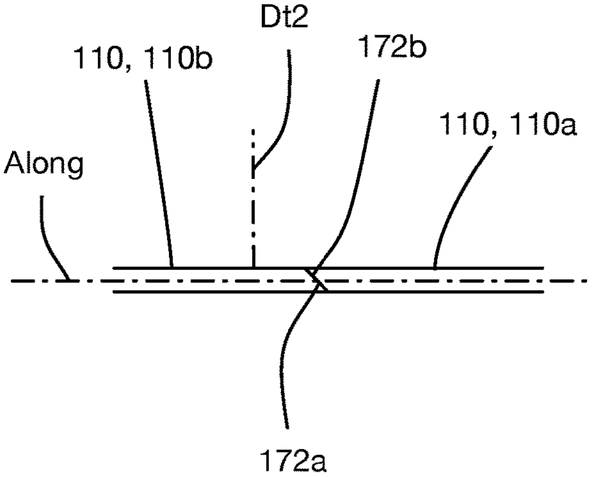
FIG. 6B shows a side view of the embodiment shown in FIG. 6A.

In the embodiment shown in FIGS. 6A and 6B, the first alignment structure 120*a* on the first end 145 of the first backing member 110*a* is an arcuate projection 620, and the second alignment structure 120*b* on the first end 145 of the second backing member 110*b* is an arcuate recess 610. In this embodiment, the arcuate projection 620 is defined by the end surface 172*a* of the first end 145 of the first backing member 110, and the arcuate recess 610 is defined by the end surface 172*b* of the first end 145 of the second backing member 110*b*. The arcuate projection 620 of the first alignment structure 120*a* and the arcuate recess 610 of the second alignment structure 120*b* are shaped to engage one another so as to guide the backing members 110*a* and 110*b* into an alignment in the first transverse direction Dt1. In other words, the arcuate projection 620 and the arcuate recess 610 ensure that the first and second backing members 110*a* and 110*b* are at the same position in the first transverse direction Dt1, so as to hold the channels 222 of the first and second backing members 110*a* and 110*b* at the same position in the first transverse direction. Furthermore, as best seen in in FIG. 6B, in some embodiments the arcuate projection 620 is defined by the first end surface 172*a* that is positioned to overlie the second end surface 172*b* defining the arcuate recess 610 when the first and second backing members 110*a* and 110*b* are mounted to the door 140. As a result of this overlying relationship, the first end surface 172*a* presses on the second end surface 172*b*, so as to hold the end of the second backing member 110*b* in alignment with the first backing member 110*a* in the second transverse direction Dt2 (and therefore holds the channels 222 of the first and second backing members 110*a* and 110*b* in alignment with one another in the second transverse direction.

For greater certainty, the first and second transverse directions Dt1 and Dt2 are transverse to the longitudinal axis of the backing member 110, and are transverse to one another.

As a result of holding the channels 222 in alignment (preferably in both the first transverse direction Dt1 and the second transverse direction Dt2), the flexible seal 130 can extend easily along the channels 222 of both the first and second backing members 110*a* and 110*b*.

As a result of providing a weather stripping assembly 100 that includes at least first and second backing members, preferably each having an alignment structure 120, and a flexible seal 130, the weather stripping assembly 100 can fit in a much smaller package size, and is, regardless of whether it is packaged or not, much smaller than a weather stripping assembly of the prior art, that includes backing members that are at least the length of the longest dimension of a door. Examples of such prior art backing members can be 8 feet or more in length.

The shapes of the arcuate projection 620 and the arcuate recess 610 are complementary, but need not be perfectly complementary. The shapes of the arcuate projection 620 and the arcuate recess 610 need merely to be sufficiently complementary to align the first and second backing members 110*a* and 110*b* relative to one another in the first transverse direction Dt1 at least, and preferably also in the second transverse direction Dt2. The arcuate shape of the projection 620 and the recess 610 facilitate mating of the projection 620 in the recess 610, however, it is possible for the shape of the projection 620 to be formed from a plurality of linear segments and for the shape of the recess 610 to be formed from a plurality of linear segments.

Figure 7A:
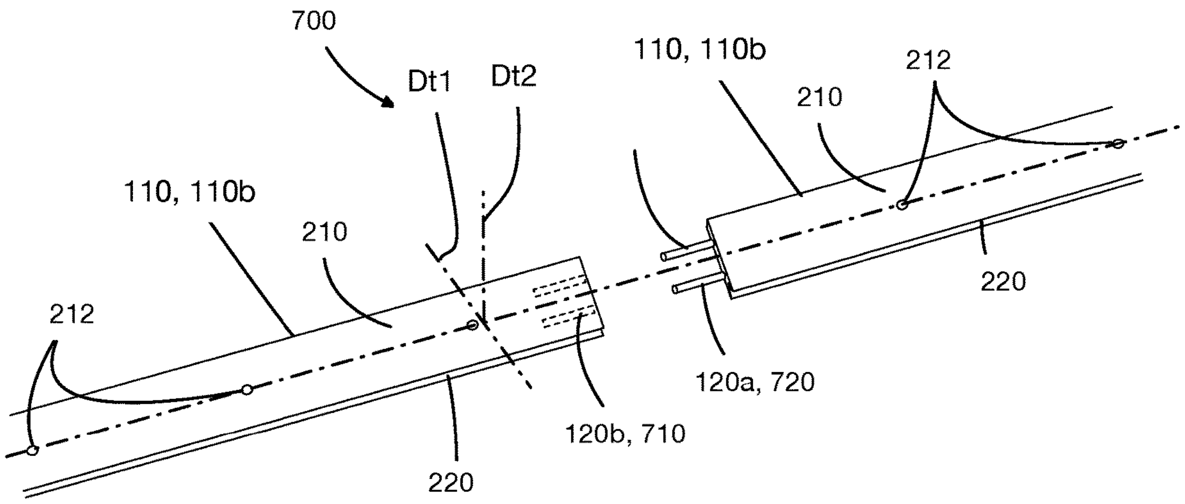
FIG. 7A shows a perspective view of an embodiment of the weather stripping assembly with first and second backing members, and an alignment structure formed by first and second projections and first and second recesses.
Figure 7B:
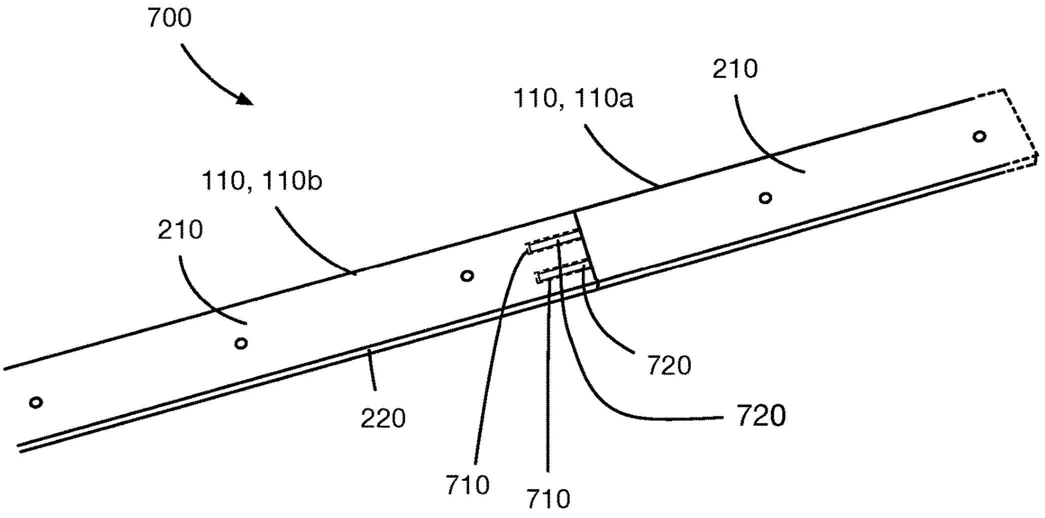
FIG. 7B shows an isometric view of the embodiment shown in FIG. 7A.

In an embodiment shown in FIG. 7A and 7B, the alignment structure 120 on the first ends 145 of the first and second backing members 110*a* and 110*b* includes first and second projections 720 which may be in the form of pins, and which are positioned at the first end 145 of the first backing member 110*a* and first and second recesses 710 which are positioned at the first end 145 of the second backing member 110*b*. The first and second projections 720 extend from the end surface of the first end 145 of the first backing member 110*a*. The first and second recesses 710 extend into the end surface of the first end 145 of the second backing member 110*b*. Insertion of the first and second projections 720 into the first and second recesses 710 aligns the first and second backing members 110*a* and 110*b* in both the first transverse direction Dt1 and the second transverse direction Dt2, such that the channels 222 of the first and second backing members 110*a* and 110*b* are aligned with one another. The fit of the first and second projections 720 into the first and second recesses 710 may be generally snug or may be relatively loose, depending on how tightly it is desired for the channels 222 of the first and second backing members 110*a* and 110*b* to be aligned. In use, as shown in FIG. 7B, the first projection and the second projection are concealed within the second backing member when received in the first recess and the second recess, respectively.

Optionally, the first and second projections 720 may be tapered (e.g., with coned ends, or hemispherical ends) in order to facilitate their insertion into the first and second recesses 710.

In the embodiment shown in FIGS. 7A and 7B, there is no need for the first and second end surfaces 172*a* and 172*b* of the first and second backing members 110*a* and 110*b* to overlie one another as the first and second projections 720 and the first and second recesses 710 align in both the first and second transverse directions Dt1 and Dt2.

In the embodiments shown in FIGS. 6A, 6B and 7A and 7B, the pass-through apertures 212 that are provided for the pass-through of the mechanical fasteners 430 may be sized so that there is some clearance relative to the diameter of the mechanical fasteners, so as to permit a bit of adjustment in the positioning of the first and second backing members 110*a* and 110*b* in order to ensure that the projection 620 can fit properly in the recess 610 or in order that the first and second projections 720 can fit properly in the first and second recesses 710, as the case may be.

In an alternative embodiment (not shown), the alignment structures on the first and second ends of the first and second backing members, respectively, include a projection and a recess in the form of a tongue and groove joint or a mortise and tenon joint.

Figure 8A:
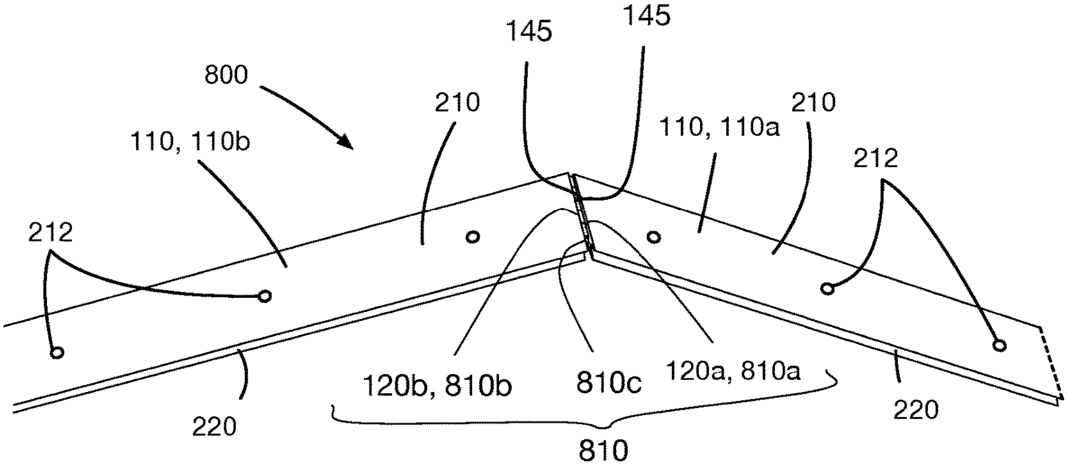
FIG. 8A shows an isometric view of an embodiment of the weather stripping assembly with first and second backing members, and an alignment structure formed by a hinge.
Figure 8B:
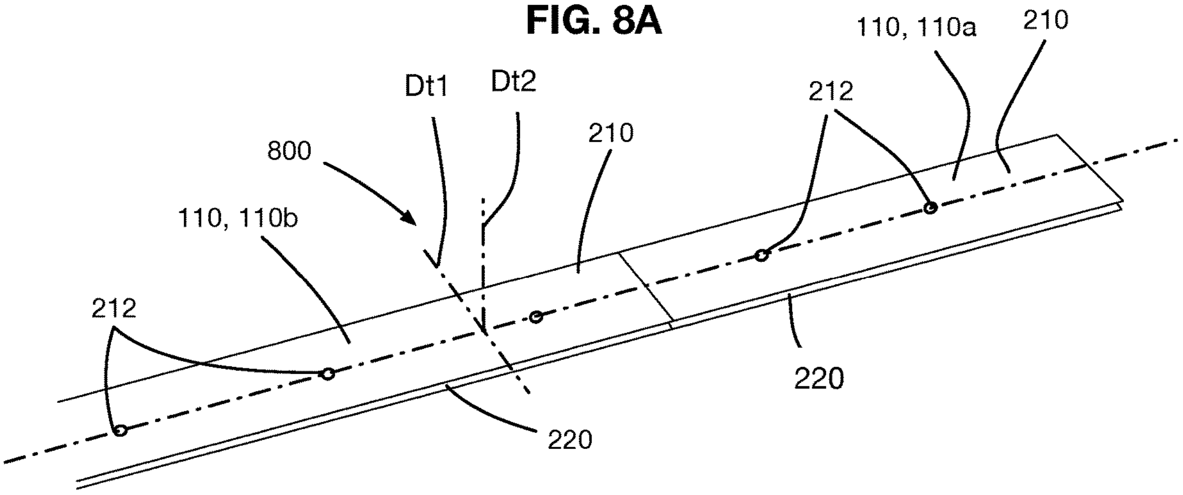
FIG. 8B shows the weather stripping assembly shown in FIG. 8A in a folded position.
Figure 8C:
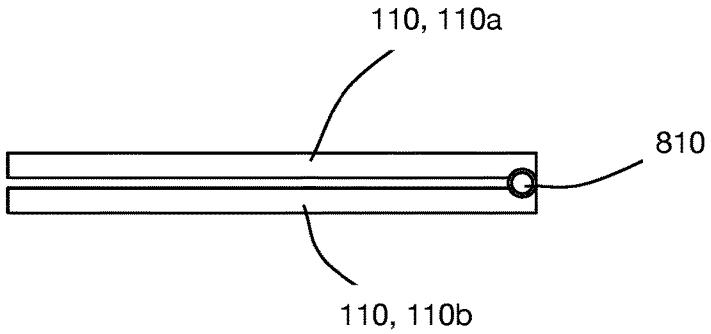
FIG. 8C shows the weather stripping assembly shown in FIG. 8A in a use position.

In an embodiment shown in FIGS. 8A, 8B and 8C, the first and second backing members 110*a* and 110*b* are coupled together via a hinge 810. In this embodiment, the hinge 810 includes a first hinge knuckle 810*a* connected to and extending from the end surface of the first end 145 of the first backing member 110*a*, a second hinge knuckle 810*b* connected to and extending from the end surface of the first end 145 of the second backing member 110*b*, and a hinge pin 810*c* that passes through the first and second hinge knuckles 810*a* and 810*b*. The hinge 810 permits the first and second backing members 110*a* and 110*b* to move between a folded position shown in FIG. 8C and a use position shown in FIG. 8B. In the folded position, the channels 222 of the first and second backing members 110*a* and 110*b* are unaligned relative to one another. In the use position the channels 222 of the first and second backing members 110*a* and 110*b* are aligned relative to one another in both the first and second transverse directions Dt1 and Dt2. Thus, in the embodiment shown in FIGS. 8A-8C, the first hinge knuckle 810*a* may be considered to be the first alignment structure 120*a* and the second hinge knuckle 810*b* may be considered to be the second alignment structure 120*b*. The first and second alignment structures 120*a* and 120*b* are engaged with one another in this example, via the hinge pin 810*c*.

While the backing members 110 have been shown in FIGS. 1-8C to each include an alignment structure 120 on only the first end 145, it is optionally possible for some of the backing members 110 to include an alignment structure 120 on both the first and second ends 145 and 147. In such an embodiment, one or more of the backing members 110 may be configured as end-members, where only one end of the backing member 110 has an alignment structure 120 positioned thereon, while any backing members 110 that are positioned in between the end-members would have alignment structures 120 on both the first and second ends 145 and 147.

Figure 9:
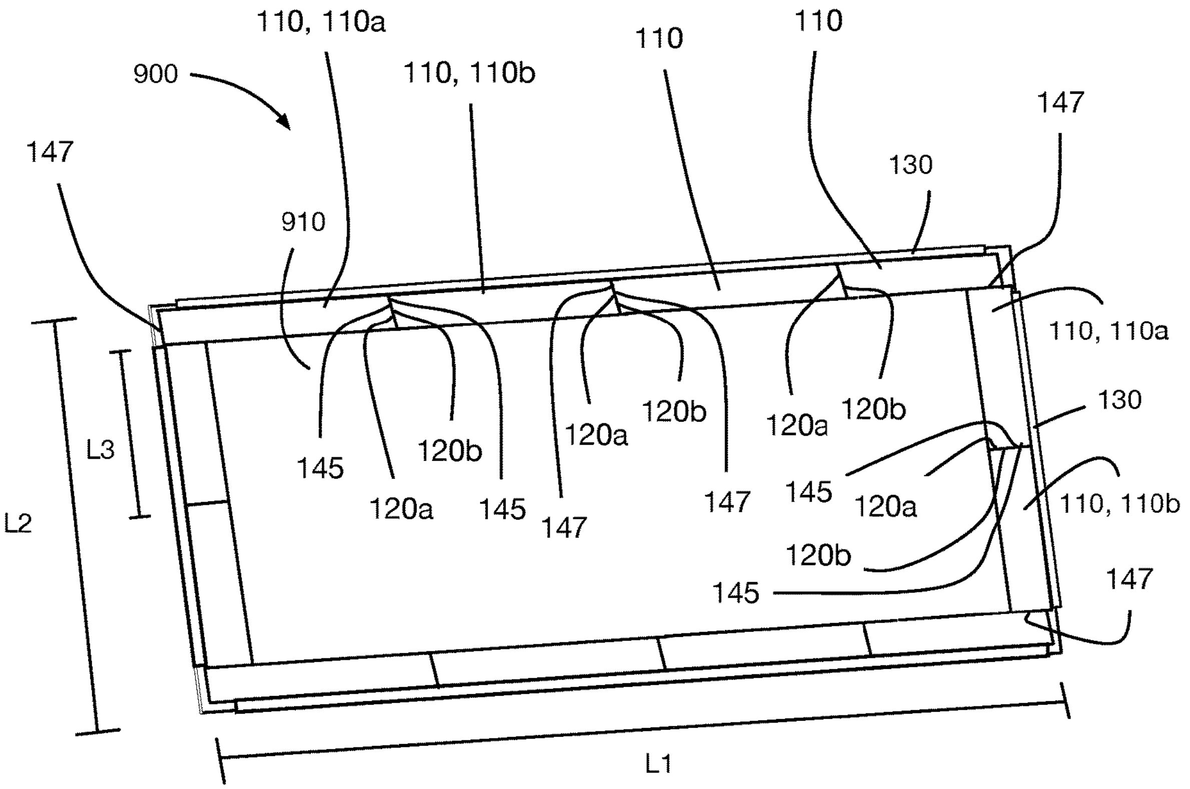
FIG. 9 shows a garage door 140 with a several weather stripping assemblies mounted on its perimeter regions.

As shown in FIG. 9, a plurality of weather stripping assemblies 100 may be applied to a door 140. In this embodiment, a plurality of weather stripping assemblies 100 on all of the perimeter regions of the door 140.

In the embodiment provided in FIG. 9, the door 140 shown is a garage door. In this embodiment, the perimeter regions at the top, bottom and sides of a first face 142 of the garage door each include a weather stripping assembly 100 including first and second backing members 110 on the sides (identified at 110*a* and 110*b*), or including first, second, third and fourth backing members 110 on the top and bottom (the first and second have been identified at 110*a* and 110*b*). In this embodiment, each of the backing members 110 is sized to have a length of no more than half the smallest dimension of the garage door. The door 140 is a standard garage door 140 having a length L1 of sixteen feet and a height L2 of eight feet. Each of the backing members 110 has a length L3 of not more than four feet. In this embodiment, each weather stripping assembly 100 positioned along the top, bottom and sides includes a flexible seal received within the coaxially aligned channels 222 of each weather stripping assembly 100.

While the backing members 110 have been described as having first and second longitudinal faces 210 and 220, and having the channel 222 on the second longitudinal face 220, it will be understood that it is possible for the backing members 110 to have a generally arcuate exterior surface such that there is not a second longitudinal face that is readily identifiable. Accordingly, the backing members 110 may have any suitable number of longitudinal faces, such as one longitudinal face. Irrespective of how many longitudinal faces the backing member 110 has, the backing member 110 has the channel 222 for holding the flexible seal 130.

While embodiments have been described with specificity to garage and other residential type doors, other types of implementations will occur to those of skill in the art. For example, it will be understood that the terms doorway, door frame, frame or door jamb employed in the specification and claims may constitute a portion of window casing door frame or garage door jamb or any other border member intended to outline an opening to be protected by the door, window, or closure mentioned herein.

While it is advantageous to provide the alignment structures 120 on the backing members 110, it is alternatively possible for the backing members to omit the alignment structures 120. In such an embodiment, the weather stripping assembly 100 is still advantageous over the prior art.

The above-described embodiments are intended to be examples of the present invention and alterations and modifications may be affected thereto, by those of skill in the art, without departing from the scope of the invention that is defined solely by the claims appended hereto.

What is claimed is:

1. A weather stripping assembly for application to a door in a doorway, comprising:

a first backing member and a second backing member having a longitudinal axis, and first and second transverse directions, wherein each of the first and second backing members includes a channel, wherein the first and second backing members each have a mounting region that is positioned for mounting to a perimeter region of the door, wherein the first backing member has a first alignment structure on a first end thereof, and the second backing member has a second alignment structure on a first end thereof, wherein the first and second alignment structures are engageable with one another to coaxially align the channel of the first backing member with the channel of the second backing member in the first transverse direction and the second transverse direction; and a single flexible seal that is shaped to be held in and extend along the channels of both the first and second backing members so as to extend from the channel of the first backing member into the channel of the second backing member when the first and second backing members are positioned with the first and second alignment structures in engagement with one another such that the channels of the first and second backing members are aligned coaxially with one another.

2. The weather stripping assembly of claim 1, wherein each of the plurality of backing members has a length of not more than four feet.

3. The weather stripping assembly of claim 1, wherein the first alignment structure is defined by or extends from an end surface of the first end of the first backing member, wherein the end surface of the first end of the first backing member is transverse to the longitudinal axis of the first backing member, wherein the second alignment structure is defined by or extends from an end surface of the first end of the second backing member, wherein the end surface of the first end of the second backing member is transverse to the longitudinal axis of the second backing member.

4. The weather stripping assembly of claim 3, wherein the first alignment structure includes a projection defined by the end surface of the first end of the first backing member and the second alignment structure includes a recess defined by the end surface of the first end of the second backing member, and wherein the end surface of the first end of the first backing member overlies the end surface of the first end of the second backing member.

5. The weather stripping assembly of claim 3, wherein the first alignment structure further includes a first projection and a second projection, and the second alignment structure includes a first recess and a second recess, wherein the first projection and the second projection extend from the end surface of the first end of the first backing member, and the first recess and the second recess are defined by the end surface of the first end of the second backing member, and wherein, in use, the first projection and the second projection are concealed within the second backing member when received in the first recess and the second recess, respectively.

6. The weather stripping assembly of claim 3, wherein the first alignment structure further includes a first hinge knuckle extending from the end surface of the first end of the first backing member, and the second alignment structure includes a second hinge knuckle extending from the end surface of the first end of the second backing member, and wherein the weather stripping assembly further includes a hinge pin, wherein the first and second hinge knuckles are engageable with one another via the hinge pin.

* * * * *